(12) United States Patent
Hata

(10) Patent No.: US 7,057,979 B2
(45) Date of Patent: Jun. 6, 2006

(54) ADDITIONAL INFORMATION RECORDING METHOD ON OPTICAL DISK, AND OPTICAL DISK RECORDING APPARATUS

(75) Inventor: Makoto Hata, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 337 days.

(21) Appl. No.: 10/012,393

(22) Filed: Dec. 12, 2001

(65) Prior Publication Data

US 2003/0021193 A1 Jan. 30, 2003

(30) Foreign Application Priority Data

Jul. 30, 2001 (JP) .................. P 2001-228917

(51) Int. Cl.
*G11B 7/45* (2006.01)
*H04N 7/04* (2006.01)

(52) U.S. Cl. .................. 369/30.05; 386/105
(58) Field of Classification Search ........ 369/30.05, 369/36.04, 30.5, 30.4; 386/93, 95, 46, 105; G11B 7/85; H04N 5/91, 7/04
See application file for complete search history.

(56) References Cited

U.S. PATENT DOCUMENTS

| | | | | |
|---|---|---|---|---|
| 5,303,063 A * | 4/1994 | Kim et al. | ................. | 386/93 |
| 5,475,835 A * | 12/1995 | Hickey | ................. | 707/104.1 |
| 5,585,866 A * | 12/1996 | Miller et al. | ................. | 725/43 |
| 5,737,107 A * | 4/1998 | Umeda | ................. | 398/106 |
| 5,835,530 A * | 11/1998 | Hawkes | ................. | 375/225 |
| 5,949,953 A * | 9/1999 | Shirakawa et al. | ................. | 386/70 |
| 5,963,704 A * | 10/1999 | Mimura et al. | ................. | 386/95 |
| 5,983,035 A * | 11/1999 | Funaki | ................. | 396/281 |
| 6,215,420 B1 * | 4/2001 | Harrison et al. | ................. | 341/22 |
| 6,392,964 B1 * | 5/2002 | Koyata et al. | ................. | 369/30.04 |
| 6,603,919 B1 * | 8/2003 | Yonetani et al. | ................. | 386/46 |

FOREIGN PATENT DOCUMENTS

| | | |
|---|---|---|
| JP | 8-19063 | 1/1996 |
| JP | 9-224081 | 8/1997 |
| JP | 2000-36984 | 2/2000 |

* cited by examiner

*Primary Examiner*—Aristotelis M. Psitos
(74) *Attorney, Agent, or Firm*—Morgan Lewis & Bockius LLP

(57) ABSTRACT

A method of recording additional information of a disk name of an optical disk, title information of a recorded program, etc., on the optical disk. Communication data containing edit data entered through a portable electronic machine capable of conducting wireless communications with an optical disk recording apparatus is transmitted by the portable electronic machine to the optical disk recording apparatus using the wireless communications and the edit data is recorded on the optical disk as additional information.

9 Claims, 5 Drawing Sheets

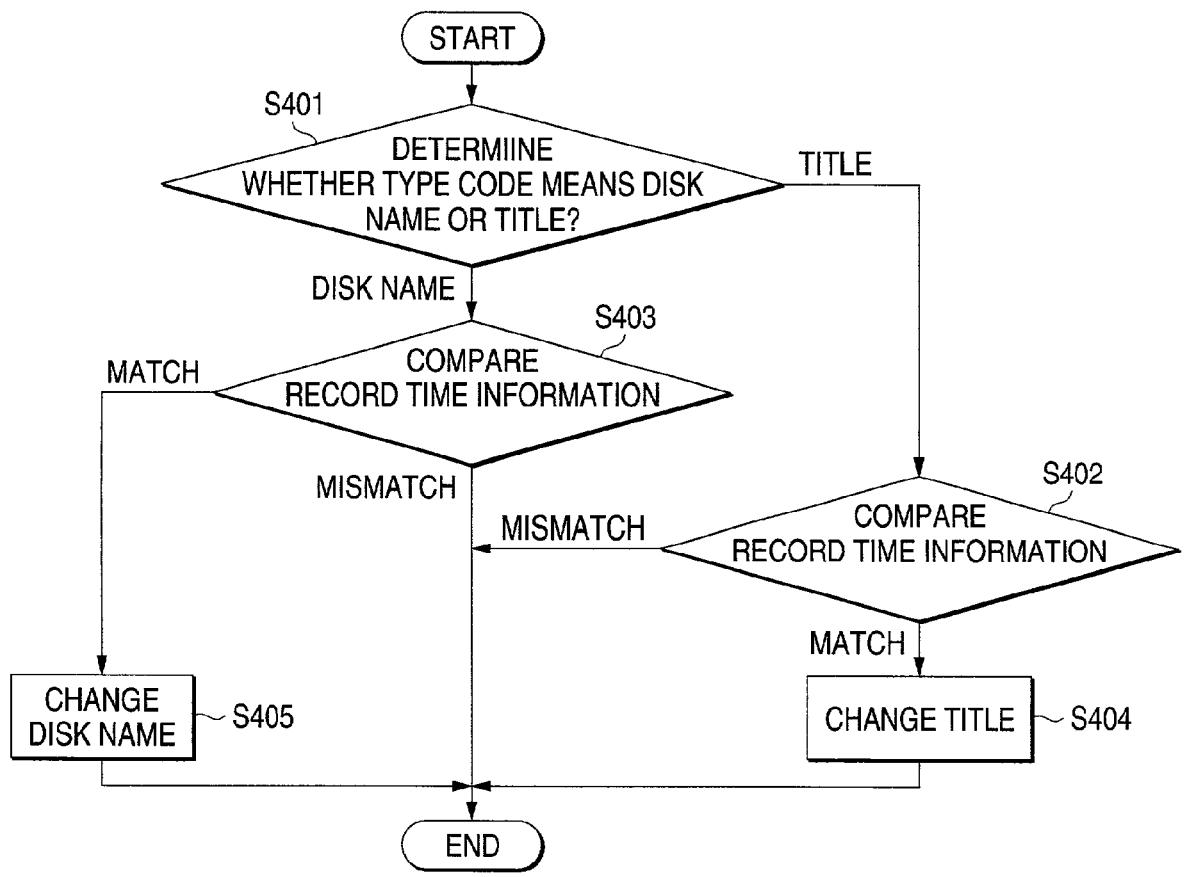

ADDITIONAL INFORMATION RECORDING METHOD ON OPTICAL DISK, AND OPTICAL DISK RECORDING APPARATUS

BACKGROUND OF THE INVENTION

1. Technical Field

This invention relates to a recording method of data on a disk-type record medium and in particular to an art of recording additional information of a disk name, a title of a program, etc., recorded on an optical disk.

2. Related Arts

Hitherto, CDs (compact disks), LDs (laser disks), etc., have been widely used as media for storing video data, audio data, or computer data. In recent years, DVDs (digital versatile disks) each having a by far larger storage capacity than the storage media have been expected as next-generation record media and have been becoming gradually pervasive.

The DVD, which is of the same size as the CD, can record a large amount of data such as video data of high image quality, sound data of high sound quality, and subtitles data, and can store data several times that on the CD.

The DVDs include playback-only disks such as DVD-ROM, DVD video, and DVD audio and record and playback disks such as DVD-RAM, DVD-R, and DVD-RW, and the specifications of the formats are defined in association with each other. Recently, a DVD recorder capable of recording and playing back DVDs, etc., has been developed increasingly and it has been made possible to record any desired data on a DVD in conformance with the specifications. The DVD recorded by the DVD recorder can be played back by a DVD playback machine compatible with the record format.

The DVD recorder also enables the user to edit the disk name of a DVD, the title of a program recorded on a DVD, etc. Since the disk name and the title edited by the user can be displayed on a display screen when the DVD is inserted into a DVD playback machine, it is convenient to distinguish one disk from another and keep track of the contents (programs) recorded on the DVD.

[Problems to be Solved]

However, to edit disk information of the disk name, the title, etc., with the DVD recorder in the related art, a mode in which the disk information can be edited, called edit mode needs to be selected.

FIG. 8 shows a display example of a general edit mode screen; information of the disk name, the titles, etc., is displayed in accordance with the disk information recorded on the disk inserted into a DVD recorder. Generally, when a program is recorded, the record date and time and the record time are automatically recorded on the disk as program information and thus if the user does not edit disk information, only the record times corresponding to the recorded programs are displayed as shown in FIG. 8.

For the user to edit disk information, he or she displays the edit mode screen shown in FIG. 8 and uses an attached input unit such as a remote control to select an editable field (displayed as "*" in FIG. 8) and enter any desired character string, thereby editing the disk information. Thus, in the DVD recorder in the related art, the disk information cannot be edited while a program is recorded.

In general, to enter the disk information, any desired characters are selected and determined out of a character string table displayed on a display screen. In this case, however, the user must move a cursor on the character string table to determine the characters with an attached remote control and thus it is very intricate to edit the disk information.

By the way, in recent years, attention has been focused on wireless communication technologies including infrared communications, and various devices installing a wireless communication function have been provided.

For example, the Unexamined Japanese Patent Application Publication No. Hei8-19063 discloses an art of using a communication terminal capable of conducting infrared communications to get program information distributed by a communication station via a network and transmitting record programming data to a videocassette recorder, etc., using infrared communications from the communication terminal. The Unexamined Japanese Patent Application Publication No. Hei9-224081 discloses an art concerning a home information communication apparatus capable of conducting a plurality of multimedia communications concurrently and illustrates infrared communications using a portable information terminal called a PDA (personal digital assistant) as one of the multimedia communications. JP-A-2000-36984 discloses an art concerning a portable terminal (mobile telephone) installing an infrared communication function.

Thus, in portable electronic machines such as PDAs and mobile telephones, there is a trend toward installation of a wireless communication function for enabling data to be wireless transmitted and received between the machines. It is considered that machines installing the wireless communication function, not only portable information terminals, but also general household electric appliances will increase in the future.

SUMMARY OF THE INVENTION

It is an object of the invention to provide an art capable of easily editing disk information of an optical disk (additional information) by using wireless communications between an optical disk recording apparatus and a portable electronic machine.

[Means for Solving the Problem]

To the end, according to the invention, there is provided an additional information recording method on an optical disk for recording additional information of a disk name of an optical disk, title information of a recorded program, etc., on the optical disk using an optical disk recording apparatus comprising a wireless communication function, the additional information recording method comprising the steps of transmitting communication data containing edit data entered through a portable electronic machine capable of conducting wireless communications with the optical disk recording apparatus from the portable electronic machine to the optical disk recording apparatus using the wireless communications and recording the edit data on the optical disk as additional information.

Accordingly, the disk information can also be edited with the portable electronic machine when the optical disk recording apparatus is operating, so that the flexibility of editing the disk information is widened.

Particularly, to transmit and receive communication data to and from the portable electronic machine using infrared communications, the infrared communication function that a general optical disk recording apparatus comprises to receive a remote control signal can be used.

The communication data contains identification information to identify the machine transmitting the communication data, and the optical disk recording apparatus processes the received communication data based on the identification information. That is, to use the infrared communications, both a remote control signal and a signal from the portable electronic machine are received at an infrared port and thus the identification information is added to the communication data so that the signals can be distinguished from each other.

The communication data contains the record time information for each title, and the optical disk recording apparatus compares the record time information for each title with the record time information for each title recorded on the optical disk, and determines whether or not edit processing is enabled based on the comparison result.

Accordingly, editing the disk information of the optical disk by mistake can be prevented. The record time information for each title is recorded whenever a program is recorded on the optical disk, and thus the record time information can be used effectively.

If it is made possible to temporarily store the communication data in the portable electronic machine, the user can edit anywhere. For example, to edit the disk information away from home, the user may temporarily store the communication data in the portable electronic machine and then transmit the edit data to the optical disk recording apparatus at home. Accordingly, the user can edit the disk information efficiently.

BRIEF DESCRIPTION OF THE DRAWINGS

FIG. 1 is a schematic block diagram of an optical disk record and playback apparatus (DVD video recorder) according to one embodiment of the invention;

FIG. 2 is a block diagram to show a schematic configuration of a mobile telephone 250 incorporating the invention;

FIG. 3 shows an example of a display screen displayed on a display section 310 of the mobile telephone 250 when disk information is edited;

FIG. 4 shows an example of a data structure used with infrared communications;

FIG. 5 is a flowchart to show a processing procedure of infrared communications in the optical disk record and playback apparatus according to the embodiment of the invention;

FIG. 6 shows another example of a display screen displayed on the display section 310 of the mobile telephone when disk information is edited;

[FIG. 7]

FIG. 7 is a flowchart for the optical disk record and playback apparatus according to the embodiment of the invention to automatically determine an optical disk and process edit data; and

[FIG. 8]

FIG. 8 shows a display example of an edit mode screen of optical disk record and playback apparatus.

DETAILED DESCRIPTION OF THE PREFERRED EMBODIMENTS

[Mode for Carrying out the Invention]

Figure 1:
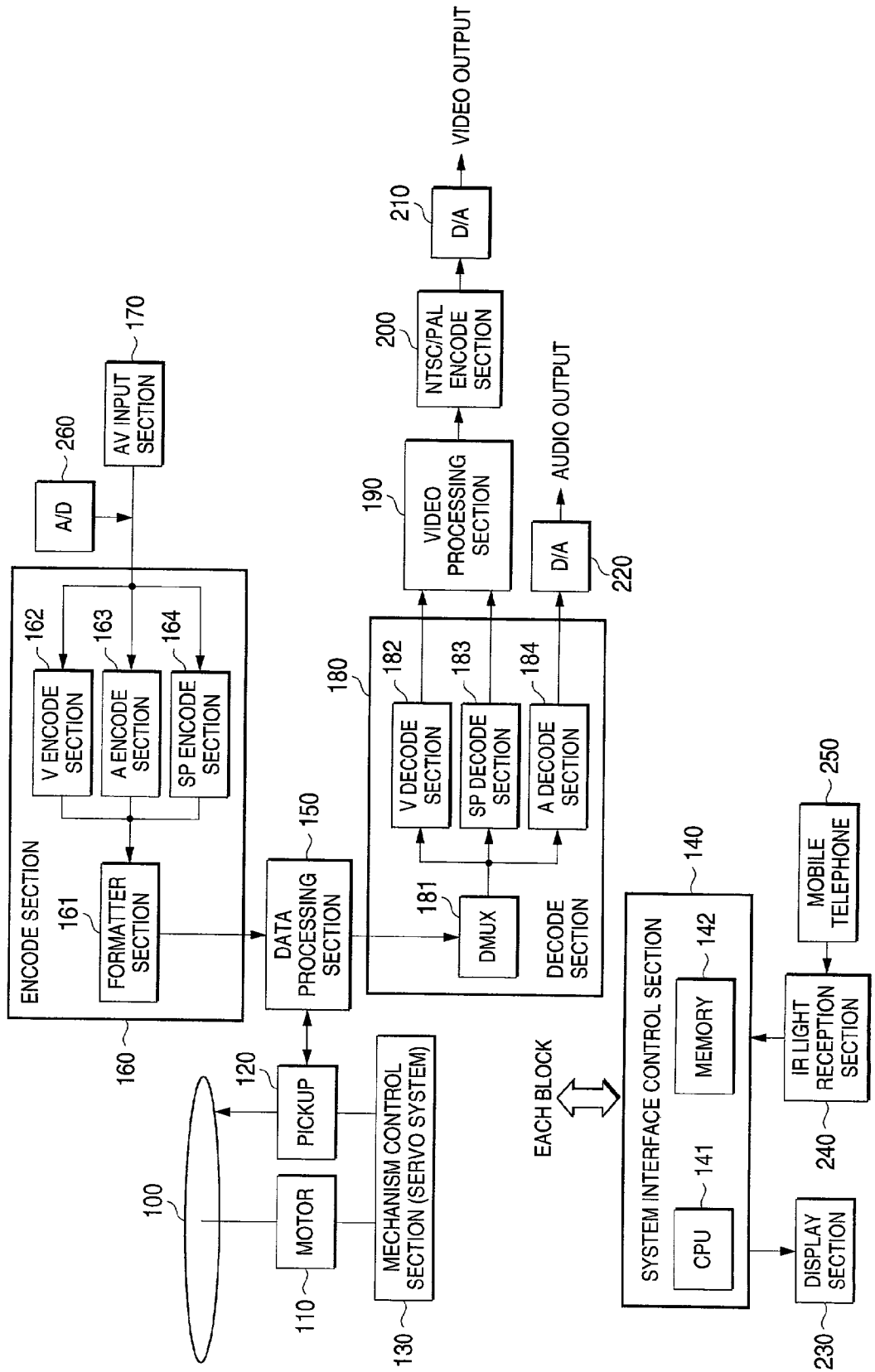
[FIG. 1]

Referring now to the accompanying drawings, there is shown a preferred embodiment of the invention. FIG. 1 is a schematic block diagram of an optical disk record and playback apparatus (DVD video recorder) according to one embodiment of the invention.

The optical disk record and playback apparatus shown in FIG. 1 comprises a motor 110 for rotating an optical disk 100 set on abase (not shown), a pickup 120 for reading data recorded on the optical disk 100 and writing data onto the optical disk 100, a mechanism control section 130 for controlling the mechanical system containing the motor 110 and the pickup 120, a system interface control section 140 for controlling the whole apparatus including record and playback processing on the optical disk 100, a data processing section 150 for performing predetermined processing for data when the optical disk is recorded and played back, an AV signal input section 170 for inputting an external signal, an A/D converter 260 for converting the input AV signal into a digital signal, an encode section 160 for encoding the digital signal, a decode section 180 for decoding playback data transferred from the data processing section 150, a video processing section 190 for combining the video data provided by the decode section 180 and subpicture data (SP data), a video encoder 200 for encoding a color difference signal into the NTSC system (or the PAL system), D/A converters 210 and 220 each for converting the digital signal into an analog signal, a display section 230 for displaying disk information of optical disk and the like, and an infrared ray reception section 240 capable of receiving an infrared signal from an external unit such as a remote control or a mobile telephone.

The mechanism control section 130 performs servo control for making the rotation speed of the motor 110 constant and performs positioning control of the position of the pickup 120 by controlling an actuator of the pickup 120 in response to the track position specified from the system interface section 140.

The system interface section 140 contains a CPU 141 and memory 142. The memory 142 stores a program, etc., for realizing record and playback processing of an optical disk, and the CPU 141 performs control processing of record and playback processing, etc., by executing the program.

In the playback operation mode, the data processing section 150 receives a playback signal from a disk drive section, performs demodulation and error correction processing, and transfers a demodulation signal to the decode section 180. In the record operation mode, to record a record signal from the encode section 160 on the optical disk 100, the data processing section 150 adds an error correction code to the record signal and then conducts modulation and transfers a modulation signal to the pickup 120. The data processed in the data processing section 150 includes video data (V data), subpicture data (SP data) of subtitles, etc., audio data (A data), and the like.

The decode section 180 is made up of a demultiplexer 181, a video data decode section 182, a subpicture data decode section 183, and an audio data decode section 184.

The demultiplexer 181 demultiplexes video data, audio data, etc., time-division-multiplexed according to the program stream specifications into data in accordance with identification information.

The data provided by the demultiplexer 181 is transferred to the video data decode section 182, the subpicture data decode section 183, and the audio data decode section 184 for decoding the data. The decoded video data and subpicture data are combined by the video processing section 190 and the resultant video signal is output through the video encoder 200 and the D/A converter 210. On the other hand, the decoded audio data is output through the D/A converter 220.

A video signal and an audio signal from an external unit or a broadcast signal received at a tuner is input to the AV input section 170. The input analog signal is converted into digital data by the A/D converter 260 and the digital data is transferred to the encode section 160.

The encode section 160 is made up of a formatter section 161, a video data encode section 162, an audio data encode section 163, and a subpicture data encode section 164.

The digital data provided by the A/D converter 260 is transferred to the video data encode section 162, the subpicture data encode section 164, and the audio data encode section 163 for encoding the digital data. The encoded data is put into a packet and a pack by the formatter section 161 and the result is transferred to the data processing section 150.

The infrared ray reception section 240 is an infrared port conforming to the IrDA (Infrared Data Association) standard and makes it possible not only to receive an infrared signal from a remote control, but also to conduct infrared communications with a machine 250 (for example, mobile telephone) having an infrared port conforming to the IrDA standard.

Thus, the optical disk record and playback apparatus of the embodiment can also receive data transmitted from the mobile telephone 250, etc., at the infrared ray reception section 240 and can perform write processing onto optical disk based on the data transmitted from the mobile telephone 250.

Figure 2:
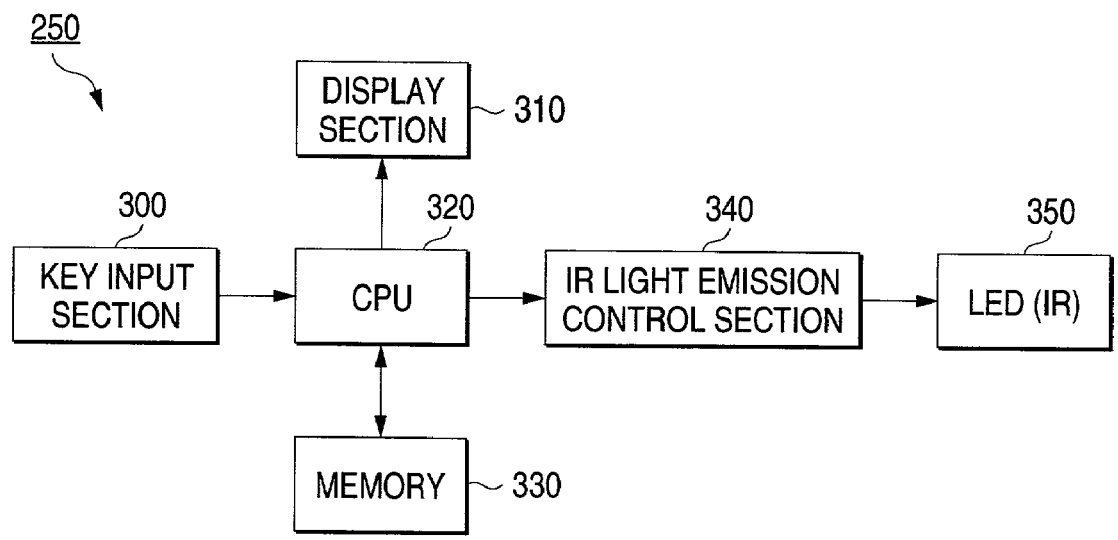
[FIG. 2]

FIG. 2 is a block diagram to show a schematic configuration of the mobile telephone 250 incorporating the invention. The mobile telephone 250 of the embodiment has a key input section 300 consisting of a ten-key numeric pad for entering a telephone number, etc., and special keys for displaying various menus, a display section 310 implemented as a liquid crystal panel capable of displaying a telephone number and any desired information, a CPU 320 for controlling the whole mobile telephone 250, memory 330 storing telephone number information, predetermined formats used for conducting infrared communications, etc., an IR ray emission control section 340 for performing control particularly concerning infrared communications, and an infrared ray emission section 350 of a light emitting diode, etc., for emitting infrared radiation.

Figure 3:
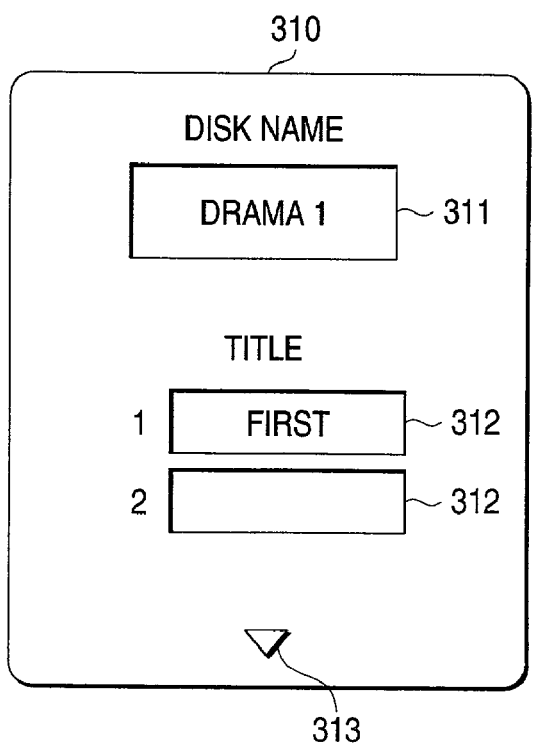
[FIG. 3]

FIG. 3 shows an example of a display screen displayed on the display section 310 of the mobile telephone 250 of the embodiment when disk information is edited; the mobile telephone 250 in FIG. 2 can be used to edit the disk information of one optical disk. The display format data in FIG. 3 is previously stored in the memory 330.

For example, to edit the disk information, the user operates the key input section 300 to select a mode in which the disk information can be edited for displaying the display screen shown in FIG. 3 on the display section 310. The user selects a disk name display field 311 and a title display field 312 on the screen and enters any desired character string in each selected field for editing the information. The user operates the key input section 300 to transmit the edited disk information from the mobile telephone 250 to the optical disk record and playback apparatus for updating the disk information. The edit data can also be temporarily stored in the memory 330 for later transmitting the edit data to the optical disk record and playback apparatus. Since the edit data can be thus temporarily recorded in the mobile telephone 250, the disk information can also be edited during the operation of the optical disk record and playback apparatus.

To enter a character string, a character string input method in the actual use in the mobile telephone 250 already existing can be used. The user can display a large amount of information on the display section 310 of the mobile telephone 250 by scrolling the screen vertically or horizontally. For example, in FIG. 3, a ∇ marker 313 is displayed at the bottom of the display section 310, indicating that the information that can be displayed on the display section 310 follows.

Figure 4:
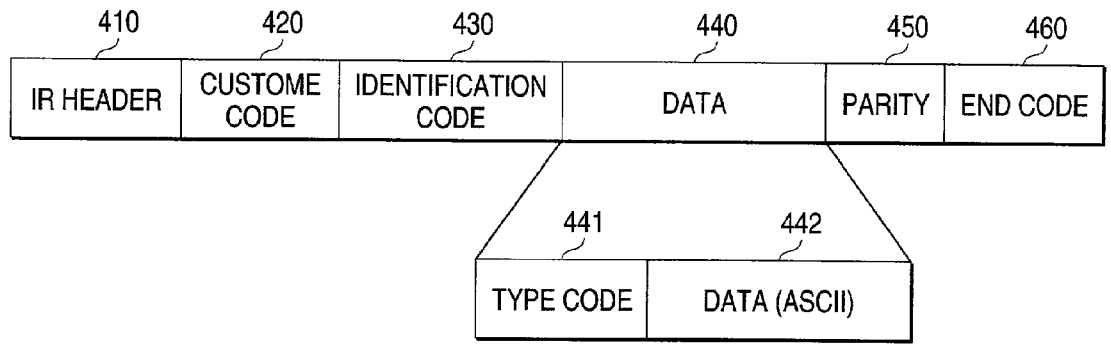
[FIG. 4]

FIG. 4 shows an example of a data structure used with infrared communications. As shown in FIG. 4, the communication data used in the embodiment consists of an IR header section 410 indicating that the data is infrared communication data, a custom code section 420 containing proper information to the machine to which the data is to be transmitted (optical disk record and playback apparatus), an identification code section 430 storing the data type, a data section 440 containing disk information, a parity section 450 used for detecting a data transfer error, and an END code section 460 indicating the end of the data.

The custom code section 420 contains the manufacturer code, the machine code, etc., of the associated machine to which the data is to be transmitted, and is used to identify the party to communicate.

The identification code section 430 is used to determine whether the communication data is the data transmitted from the remote control or the data transmitted from the mobile telephone. For example, if the identification code is "0," it indicates the data transmitted from the remote control; if the identification code is "1," it indicates the data transmitted from the mobile telephone.

The data section 440 contains a type code 441 to determine whether the edit data to be recorded is disk name data or title data and essential edit data 442 converted into ASCII code. For example, if the type code 441 is "0," it may mean that the edit data 442 is the disk name data; otherwise, it may mean that the edit data 442 is the title data.

Figure 5:
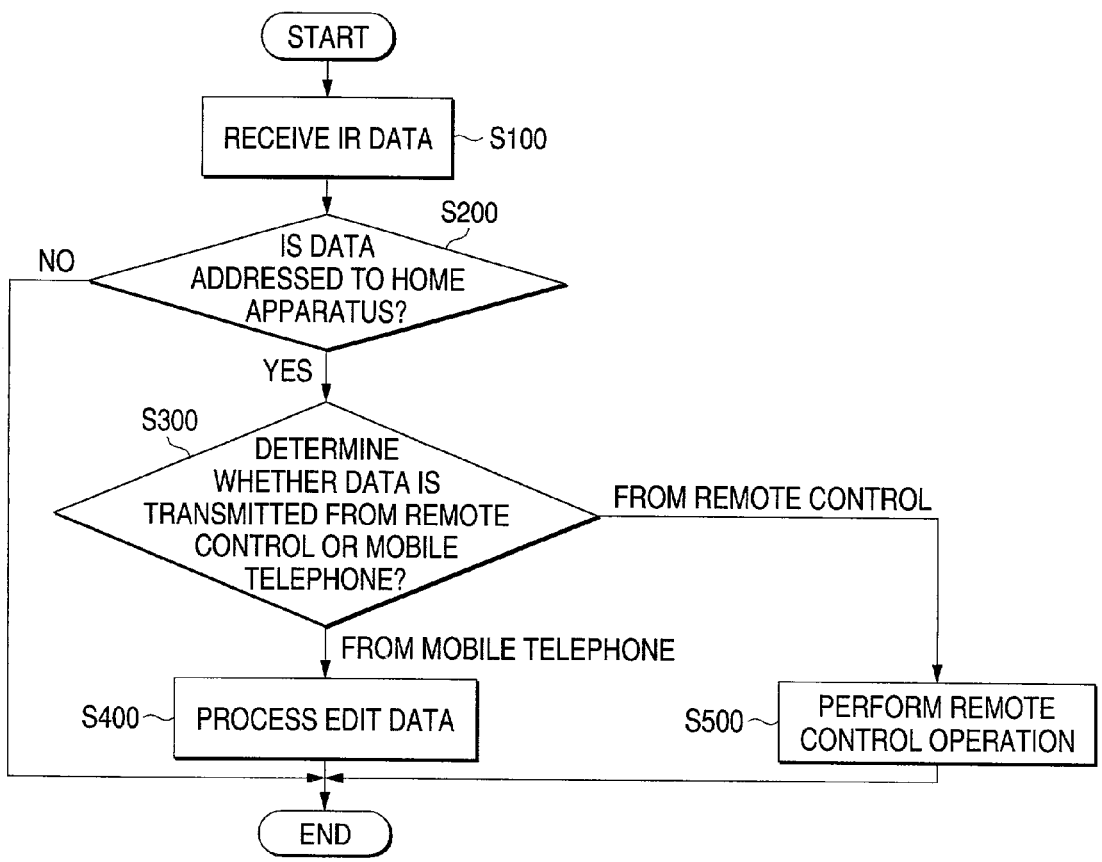
[FIG. 5]

FIG. 5 is a flowchart to show a processing procedure of infrared communications in the optical disk record and playback apparatus.

The optical disk record and playback apparatus is always ready to receive and when infrared data is transmitted from an external unit, the infrared data is received at the infrared ray reception section 240 (step S100). Next, whether or not the received data is the data directed to the home apparatus is determined based on the manufacturer code, the machine code stored in the custom code section 420 of the received data (step S200). If it is determined that the data is not directed to the home apparatus, the received data is discarded; on the other hand, if it is determined that the data is directed to the home apparatus, control goes to step S300.

Next, whether the received data is transmitted from the remote control or the mobile telephone is determined based on the identification code 430 of the received data (step S300). If it is determined that the data is transmitted from the remote control, control goes to step S500 and predetermined operation of playing back optical disk, etc., is controlled. On the other hand, if it is determined that the data is transmitted from the mobile telephone, control goes to step S400 and edit processing of disk information of optical disk is performed.

At this time, the edit data type (disk name or title) is determined based on the type code in the data section 440 and the edit data 442 is recorded in a predetermined storage area of the optical disk based on the determination result.

To process the edit data at step S400, it is advisable to display a screen for editing the disk information of the optical disk (see FIG. 8) on the screen of a display connected to the optical disk record and playback apparatus for requesting the user to check edit processing. In doing so, the user can be prevented from editing the disk information of another optical disk by mistake.

Whether or not the optical disk to edit the disk information is correct can also be automatically determined in the optical disk record and playback apparatus. Specifically, the function can be provided by using record time information, etc., automatically recorded when a program is recorded.

Figure 6:
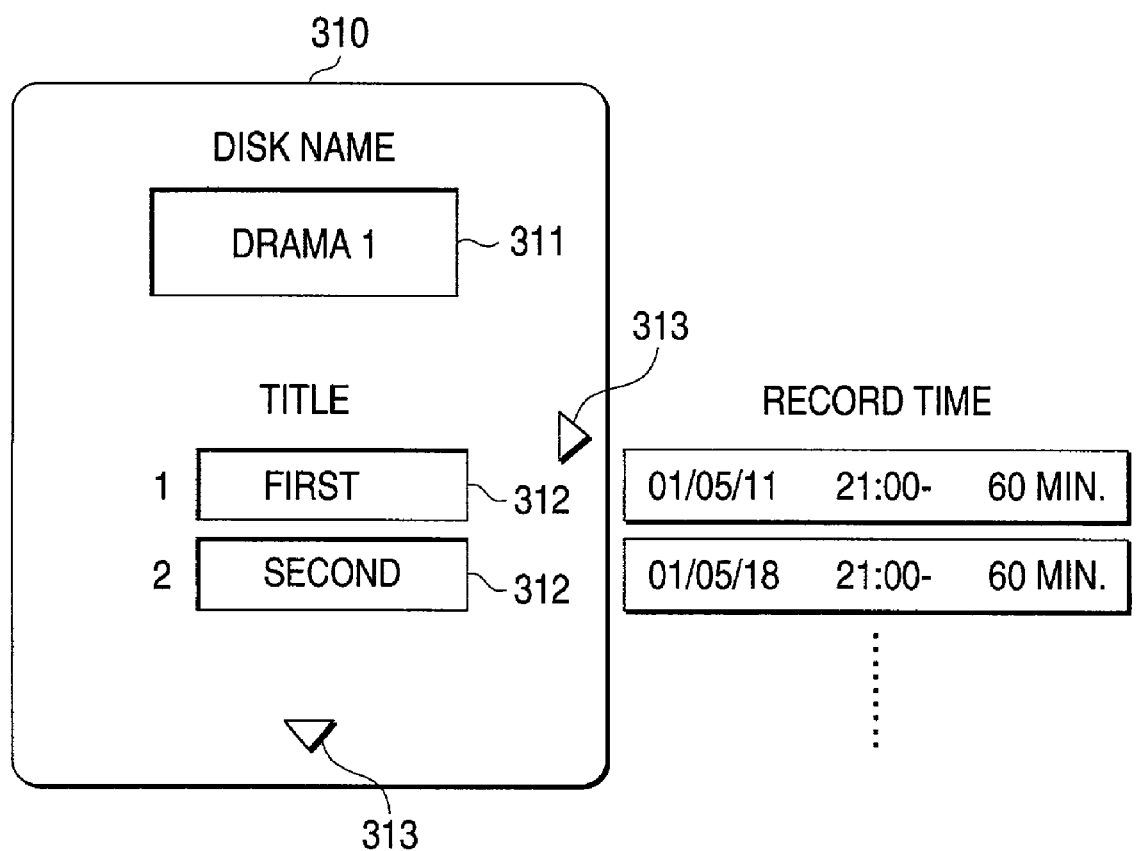
[FIG. 6]

FIG. 6 shows another example of a display screen displayed on the display section 310 of the mobile telephone when disk information is edited; record time information is added to the display example in FIG. 3. In the display example in FIG. 6, the record time information field is displayed by scrolling the display range to the right.

For example, the user operates the key input section 300 to select disk edit out of the menu screen for displaying the display screen shown in FIG. 6 on the display section 310. The user selects a disk name display field 311 and a title display field 312 on the screen and enters any desired character string in each selected field for editing the information.

Further, the user enters the record time information of the programs recorded on the optical disk for each title. The optical disk record and playback apparatus automatically determines whether or not the optical disk to edit the disk information is inserted based on the record time information.

FIG. 7 is a flowchart for the optical disk record and playback apparatus to automatically determine an optical disk and process edit data.

First, whether the edit data is disk name data or title data is determined based on the type code 441 of the edit data. If the type code means disk name, control goes to step S403; if the type code means title, control goes to step S402.

At step S403, the record time information of each title entered by the user through the mobile telephone 250 is compared with the record time information recorded on the optical disk. Here, every piece of the record time information entered by the user is compared with the record time information recorded on the optical disk, whereby recording the edit data on the optical disk by mistake can be prevented effectively. This means that when the record time information for each title, entered by the user all matches the record time information recorded on the optical disk, it is determined that the optical disk to edit the disk information is inserted in the optical disk record and playback apparatus.

If the record time information matches at step S403, control goes to step S405 and the disk name is changed; if the record time information does not match, the disk name is not changed. At this time, the disk information of the inserted optical disk is displayed and a message is displayed to the effect that the inserted optical disk differs from the optical disk to edit the disk information by the user.

At step S403, if the user does not enter all the record time information for titles, a determination may be made based only on the entered record time information.

At step S402, the record time information entered by the user through the mobile telephone 250 corresponding to the edit data of the title is compared with the record time information recorded on the optical disk. The record time information entered by the user is thus compared with the record time information recorded on the optical disk, whereby editing the title by mistake can be prevented effectively.

If the title whose corresponding record time information matches the record time information recorded on the optical disk exists at step S402, control goes to step S404 and the title is changed; if the title whose corresponding record time information matches the record time information recorded on the optical disk does not exist, title change is not executed. At this time, the disk information of the inserted optical disk is displayed and a message is displayed to the effect that the inserted optical disk differs from the optical disk to edit the disk information by the user. On the display screen, the user can check that the entered record time information is not erroneous by checking the disk information of the optical disk inserted in the optical disk record and playback apparatus.

The disk information is edited according to the described procedure, whereby worry that the disk name or the title may be rewritten by mistake is eliminated. If the disk information of the optical disk to edit is previously transmitted from the optical disk record and playback apparatus to the mobile telephone so that the record time information corresponding to each title is already entered, the defect of making it impossible to perform edit processing because of an entry mistake of the record time information by the user can be circumvented.

Although our invention has been specifically described based on the embodiment, it is to be understood that the invention is not limited to the specific embodiment thereof. In the embodiment, the edit data of an optical disk is transmitted using infrared communications; however, for example, data can also be transmitted and received using communication technologies of Bluetooth, etc.

The machine for editing the disk information is not limited to the mobile telephone if it can wireless communicate with the optical disk record and playback apparatus; for example, a portable information terminal such as a PDA can also be used.

[Advantages of the Invention]

According to the invention, in the method of recording additional information of the disk name of an optical disk, the title of each recorded program, etc., on the optical disk in the optical disk recording apparatus comprising a wireless communication function, communication data containing edit data entered through a portable electronic machine capable of conducting wireless communications with the optical disk recording apparatus is transmitted by the portable electronic machine to the optical disk recording apparatus using the wireless communications and the edit data is recorded on the optical disk as additional information. Thus, the disk information can also be edited with the portable electronic machine when the optical disk recording apparatus is operating, so that the flexibility of editing the disk information is widened.

What is claimed is:

1. An additional information recording method on an optical disk for recording additional information on the optical disk using an optical disk recording apparatus comprising a wireless communication function, the additional information recording method comprising the steps of:

transmitting a wireless communication data using portable electronic machines adapted to conduct the wireless communications with the optical disk recording apparatus, wherein at least one portable electronic machine is adapted to temporarily store the wireless communication data;

identifying a source portable electronic machine based on a transmitted wireless communication data using a two-level decision making unit;

comparing the transmitted wireless communication data with a recorded data on the optical disk to determine whether or not edit processing is enabled based on the comparison result; and recording the transmitted wireless communication data on the optical disk as the additional information, wherein the wireless communication data includes record time information for each title, the optical disk recording apparatus compares the record time information for each title included in the wireless communication data with record time information for each title recorded on the optical disk to determine whether or not edit processing is enabled based on the comparison result.

2. The additional information recording method as claimed in claim 1, wherein the wireless communication function is an infrared communication function, and the wireless communication data is an infrared communication data.

3. The additional information recording method as claimed in claim 1, wherein the additional information includes a disk name of an optical disk, or a title of a recorded program.

4. The additional information recording method, as claimed in claim 1, wherein the transmitted wireless communication data is entered through the portable electronic machines and having a form of either a pre-stored edit data temporary stored in first portable electronic machine or a real time edit data created by second portable electronic machine.

5. The additional information recording method as claimed in claim 1, wherein the wireless communication data includes identification information to identify a source portable electronic machine transmitting the wireless communication data, wherein a two-level decision making unit uses the identification information to determine whether or not the transmitted wireless communication data is for an optical disk recording apparatus, thereafter determines whether the transmitted wireless communication data is from the first or second portable electronic machine.

6. An optical disk recording apparatus adapted to record information on an optical disk, the optical disk recording apparatus comprising at least:

a wireless communication section capable of conducting wireless communications with portable electronic machines adapted to edit the information;

additional information record section for recording the information on the optical disk based on wireless communication data transmitted from at least one portable electronic machine, wherein the information included in the wireless communication data includes record time information for each title;

communication data determination section for determining the identification information included in a transmitted wireless communication data to identify a source portable electronic machine transmitting the wireless communication data;

record time information comparison section for comparing the transmitted wireless communication data with a recorded data on the optical disk, wherein the record time information comparison section compares the record time information for each title included in the wireless communication data with record time information for each title recorded on the optical disk; and edit enable section for determining whether or not edit processing is enabled based on the comparison result of the record time information comparison section.

7. The optical disk recording apparatus as claimed in claim 6, wherein the wireless communication section is an infrared communication section, and conducts an infrared communication with the at least one portable electronic machine to receive an infrared communication data.

8. The optical disk recording apparatus as claimed in claim 6, wherein the information includes a disk name of an optical disk, or a title of a recorded program.

9. The optical disk recording apparatus as claimed in claim 6, wherein the wireless communication data includes identification information to identify a source portable electronic machine transmitting the wireless communication data, the optical disk recording apparatus further comprising:

communication data determination section to determine whether or not the information included in the transmitted wireless communication data is to be recorded on the optical disk based on the identification information.

* * * * *